(12) United States Patent
Uneme et al.

(10) Patent No.: US 12,280,650 B2
(45) Date of Patent: Apr. 22, 2025

(54) ELECTRIC DEVICE ARRANGED ON THE POWERTRAIN OF A VEHICLE

(71) Applicant: HONDA MOTOR CO., LTD., Tokyo (JP)

(72) Inventors: Takahiro Uneme, Tokyo (JP); Ryuta Wakabayashi, Tokyo (JP); Takahiro Kozeki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 303 days.

(21) Appl. No.: 17/806,082

(22) Filed: Jun. 9, 2022

(65) Prior Publication Data

US 2023/0020011 A1    Jan. 19, 2023

(30) Foreign Application Priority Data

Jul. 19, 2021  (JP) ................. 2021-118707

(51) Int. Cl.
| | |
|---|---|
| *B60K 1/04* | (2019.01) |
| *B60K 3/00* | (2006.01) |
| *B60L 3/00* | (2019.01) |
| *B60L 50/64* | (2019.01) |

(52) U.S. Cl.
CPC .............. *B60K 1/04* (2013.01); *B60L 3/0069* (2013.01); *B60L 50/64* (2019.02)

(58) Field of Classification Search
CPC ........... B60K 1/00; B60K 1/04; B60L 3/0069; B60L 50/64; B60Y 2400/61; B60Y 2410/115; Y02T 10/72
See application file for complete search history.

(56) References Cited

U.S. PATENT DOCUMENTS

| | | | |
|---|---|---|---|
| 6,907,947 B2 * | 6/2005 | Morita | ................. B60L 15/007 361/699 |
| 7,306,063 B2 * | 12/2007 | Morita | ................. B60L 3/0015 180/301 |
| 2003/0034186 A1 | 2/2003 | Morita et al. | |

(Continued)

FOREIGN PATENT DOCUMENTS

| | | |
|---|---|---|
| CN | 1701987 A | 11/2005 |
| CN | 101264735 A | 9/2008 |

(Continued)

OTHER PUBLICATIONS

Notification of Reasons for Refusal issued in the JP Patent Application No. 2021-118707, mailed on May 30, 2023.

(Continued)

*Primary Examiner* — Abdullah A Riyami
*Assistant Examiner* — Thang H Nguyen
(74) *Attorney, Agent, or Firm* — CKC & Partners Co., LLC

(57) ABSTRACT

A vehicle includes: an electric device mounted on the vehicle; a functional component placed on the electric device to extend further rearward than the electric device in plan view when mounted on the vehicle; a cable connecting the electric device and a battery mounted on the vehicle; and a cable mount that is provided below and within a plane of projection of the functional component on the electric device and has a terminal port facing downward in a vertical direction when mounted in the vehicle. The vehicle reduces the risk of a human touching an electric terminal, improving safety.

8 Claims, 8 Drawing Sheets

(56) References Cited

U.S. PATENT DOCUMENTS

| | | | |
|---|---|---|---|
| 2008/0227304 A1 | 9/2008 | Urano | |
| 2014/0238765 A1 | 8/2014 | Tomokage et al. | |
| 2014/0285139 A1* | 9/2014 | Ahn | B60L 53/36 320/108 |
| 2018/0363602 A1* | 12/2018 | Itagaki | H01L 23/467 |
| 2019/0016208 A1 | 1/2019 | Tomokage et al. | |
| 2019/0193565 A1* | 6/2019 | Yuki | B60L 3/0007 |
| 2023/0020011 A1* | 1/2023 | Uneme | B60L 50/64 |

FOREIGN PATENT DOCUMENTS

| | | |
|---|---|---|
| CN | 109256963 A | 1/2019 |
| JP | 2003102111 A | 4/2003 |
| JP | 2004168259 A | 6/2004 |
| JP | 2005143200 A | 6/2005 |
| JP | 2006088871 A | 4/2006 |
| JP | 4003950 B2 | 11/2007 |
| JP | 2008220017 A | 9/2008 |
| JP | 2009137474 A | 6/2009 |
| JP | 2013247750 A | 12/2013 |
| JP | WO2013073390 A1 | 4/2015 |
| JP | 2017034910 A | 2/2017 |
| JP | 2019002328 A | 1/2019 |
| JP | 2021160523 A | 10/2021 |

OTHER PUBLICATIONS

Office Action issued Feb. 25, 2025 in the CN Patent Application No. 202210651661.5.

\* cited by examiner

ELECTRIC DEVICE ARRANGED ON THE POWERTRAIN OF A VEHICLE

This application is based on and claims the benefit of priority from Japanese Patent Application No. 2021-118707, filed on 19 Jul. 2021, the content of which is incorporated herein by reference.

BACKGROUND OF THE INVENTION

Field of the Invention

The present invention relates to a vehicle.

Related Art

Protective measures for keeping a human from receiving an electric shock when touching a terminal of an electric device mounted on a vehicle have been proposed. An example of such measures is an interlock system that blocks conduction with a high voltage circuit section when a high voltage connector of an inverter of an electric vehicle is opened (see, e.g., Patent Document 1). According to Patent Document 1, the high voltage connector is allowed to open after a low voltage connector is detached. A switch to the high voltage connector is blocked when the low voltage connector is detached. In another proposed technique, a plate-like portion of an upper cover on an inverter unit has an overhang portion extending in a width direction of a vehicle. This portion restricts access from outside to the high voltage connector arranged to protrude from a side surface of the inverter unit in the width direction of the vehicle (see, e.g., Patent Document 2). According to Patent Document 2, an interlock functions to block a switch to the high voltage connector when the upper cover is detached. In another proposed technique, the high voltage connector is arranged in a case for housing a power supply controller of an electric vehicle to be close to one of the side surfaces of the case in the width direction of the vehicle. In case of a front collision of the electric vehicle, the rigidity of the case protects a high voltage cable from being sandwiched between deformed portions of a vehicle body (see, e.g., Patent Document 3).

Patent Document 1: Japanese Unexamined Patent Application, Publication No. 2017-34910
Patent Document 2: Japanese Unexamined Patent Application, Publication No. 2005-143200
Patent Document 3: Japanese Unexamined Patent Application, Publication No. 2003-102111

SUMMARY OF THE INVENTION

The technique of Patent Document 1 uses the interlock function to block the conduction with the high voltage section when the high voltage connector is opened. When the low voltage connector is detached, the terminal of the high voltage connector is exposed upward. This configuration provides no essential solution in terms of keeping a human from touching the terminal. According to the technique of Patent Document 2, when the upper cover on the inverter unit is detached with a tool to open the high voltage connector below the inverter unit, the terminal is exposed in a terminal port facing in the width direction of the vehicle. This is not the best measure to keep a human from touching the terminal. According to Patent Document 3, the terminal port of the high voltage connector is arranged to face downward. However, this configuration is not proposed from the viewpoint of ensuring safety, and it is unclear whether this configuration blocks access of a human's hand to the high voltage connector.

Under these circumstances, the present invention has been achieved to provide a vehicle that can reduce the risk of a human touching an electric terminal and can improve safety.

(1) The present disclosure provides a vehicle (e.g., a vehicle 1 described later). The vehicle includes: an electric device (e.g., a PCU 9 described later) mounted on the vehicle; a functional component (e.g., a resonator 8 described later) placed on the electric device to extend further rearward than the electric device in plan view when mounted on the vehicle; a cable (e.g., a cable 10 described later) connecting the electric device and a battery mounted on the vehicle; and a cable mount (e.g., a male connector 24 described later) positioned below within the plane projection of the functional component of the electric device and has a terminal port (e.g., a terminal port 25 described later) facing downward in a vertical direction when mounted on the vehicle.

(2) In the vehicle of (1), the cable is fastened to the electric device with a bolt (e.g., a headed bolt 32 described later).

(3) In the vehicle of (1) or (2), the functional component is fastened to the electric device with a bolt (e.g., a bolt 19 described later).

(4) In the vehicle of any one of (1) to (3), the electric device is mounted in a front portion of the vehicle and has the cable mount provided at a rear portion of the electric device.

(5) In the vehicle of any one of (1) to (4), the functional component has lower rigidity than the electric device.

(6) In the vehicle of any one of (1) to (5), the electric device is arranged on a powertrain of the vehicle, and the functional component is arranged on the electric device.

In the vehicle of (1), the cable mount is provided below and within the plane of projection of the functional component and has the terminal port facing downward. This reduces the risk of a human touching the terminal, improving safety.

In the vehicle of (2), the cable is fastened to the electric device with the bolt. This makes it difficult to detach the cable and reduces the risk of a human touching the terminal, improving safety.

In the vehicle of (3), the functional component is fastened to the electric device with the bolt. This makes it difficult to detach the functional component and reduces the risk of a human touching the terminal, improving safety.

In the vehicle of (4), the electric device is mounted in the front portion of the vehicle. This can improve safety in a collision.

In the vehicle of (5), the functional component has lower rigidity than the electric device. This can reduce the influence on the electric device in a collision.

In the vehicle of (6), the electric device is arranged on the powertrain of the vehicle, and the functional component is arranged on the electric device. This can reduce the influence on the electric device in a collision.

DETAILED DESCRIPTION OF THE INVENTION

Figure 1:
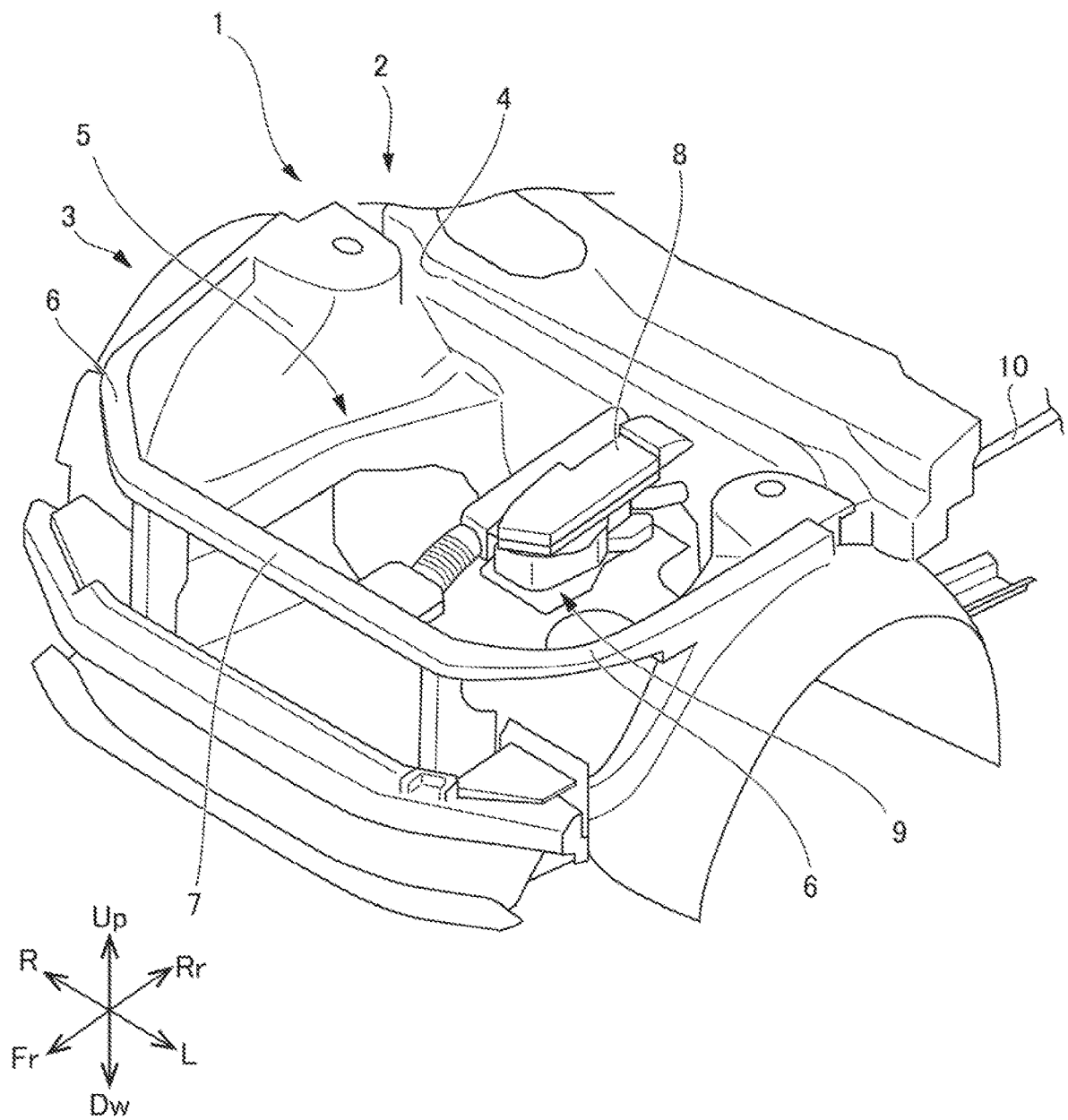
FIG. 1 is a perspective view illustrating a front portion of a vehicle according to an embodiment of the present invention.
Figure 2:
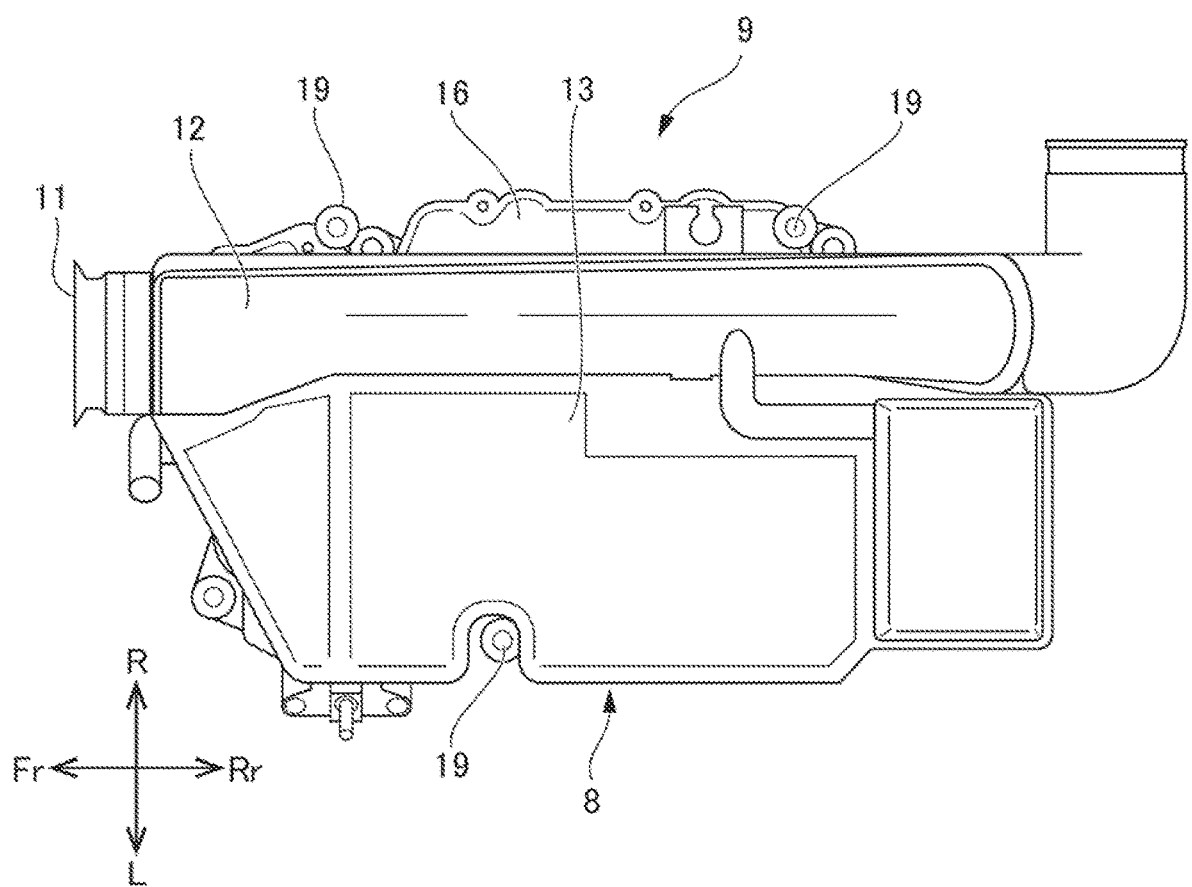
FIG. 2 is a plan view illustrating, in the same state as mounted on the vehicle, a functional component to be placed on an electric device mounted on the vehicle of FIG. 1.
Figure 3:
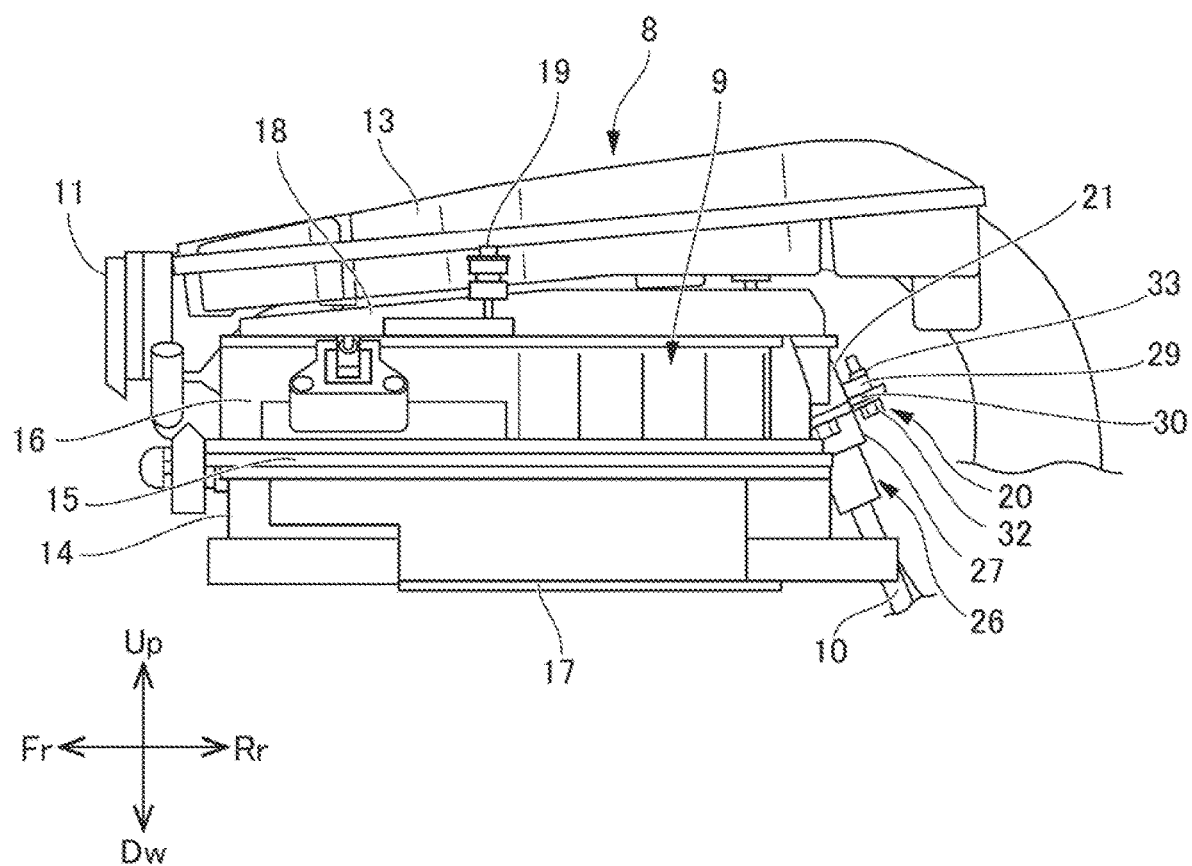
FIG. 3 is a side view illustrating, in the same state as mounted on the vehicle, the electric device mounted on the vehicle of FIG. 1 and the functional component.
Figure 4:
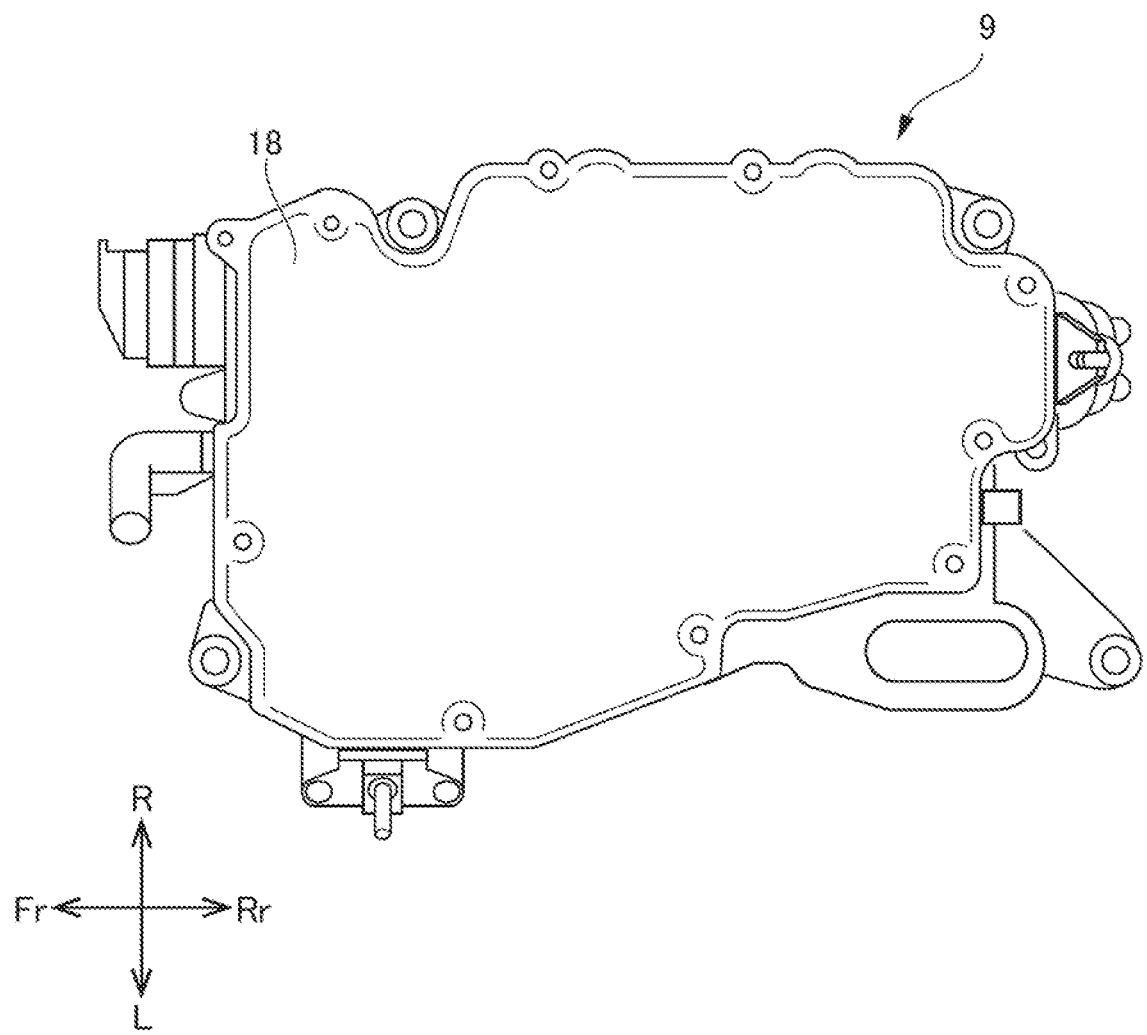
FIG. 4 is a plan view illustrating, in the same state as mounted on the vehicle, the electric device mounted on the vehicle of FIG. 1 with the functional component detached from the top of the electric device.
Figure 5:
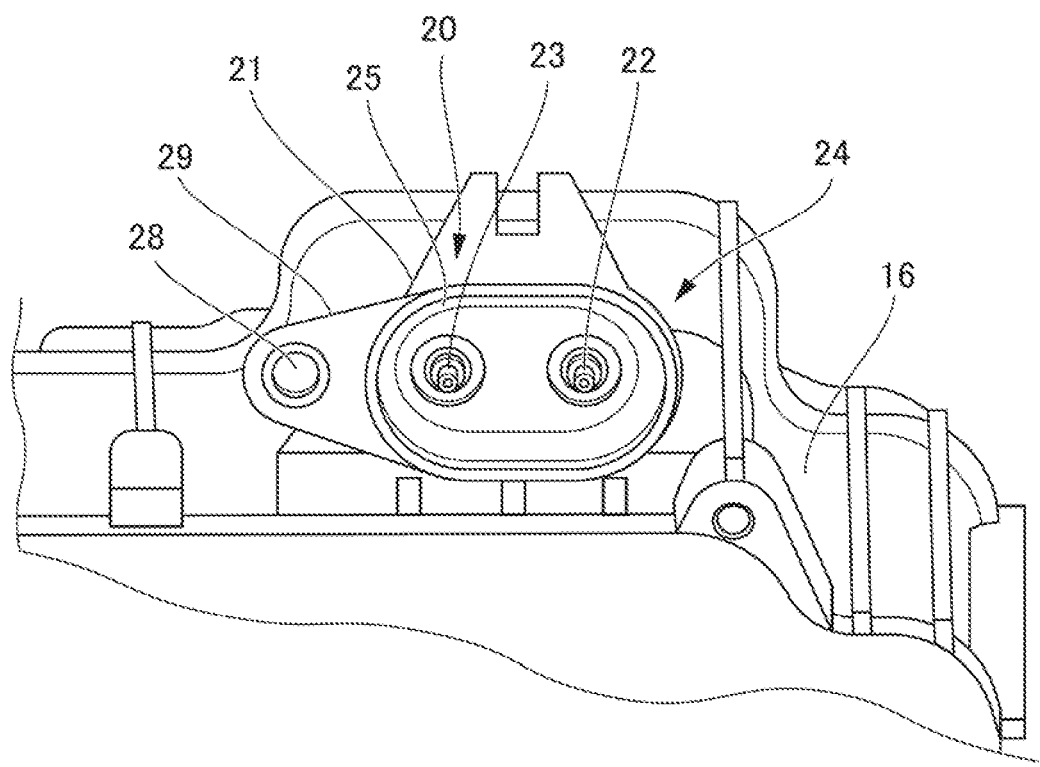
FIG. 5 is a view illustrating an open terminal port of a cable mount provided for the electric device mounted on the vehicle of FIG. 1.

Embodiments of the present invention will be described below with reference to the drawings. In the following drawings, like reference characters designate identical or corresponding components. FIG. 1 is a perspective view illustrating a front portion of a vehicle 1 according to an embodiment of the present invention. FIG. 2 is a plan view illustrating, in the same state as mounted on the vehicle, a functional component to be placed on an electric device mounted on the vehicle 1. FIG. 3 is a side view illustrating, in the same state as mounted on the vehicle, the electric device mounted on the vehicle 1 and the functional component. FIG. 4 is a plan view illustrating, in the same state as mounted on the vehicle, the electric device mounted on the vehicle 1 with the functional component detached from the top of the electric device. FIG. 5 is a view illustrating an open terminal port of a cable mount provided for the electric device mounted on the vehicle 1.

In FIGS. 1 to 5, an arrow Fr indicates a front direction of a vehicle body, an arrow Rr indicates a rear direction of the vehicle body, an arrow Up indicates an upward direction of the vehicle body, an arrow Dw indicates a downward direction of the vehicle body, an arrow L indicates a left direction in a vehicle width direction, and an arrow R indicates a right direction in the vehicle width direction.

In a front portion 3 of a vehicle body 2 of the vehicle 1 shown in FIG. 1, an engine room 5 is provided in front of a dash panel 4 arranged over almost the entire width of the vehicle body 2 in the vehicle width direction (horizontal direction). The engine room 5 is formed inside a frame constituted of left and right side members 6 extending forward from upper left and right portions of the dash panel 4 and a lateral member 7 connecting the tips of the left and right side members 6.

A powertrain including an engine (not shown) is arranged in the engine room 5. A resonator 8, which is a functional component for reducing intake noise, is provided for an intake system of the engine. As is clearly shown in FIG. 3, the resonator 8 is placed on a power control unit (PCU) 9 which is an electric device. The PCU 9 is a power control unit for driving a drive motor of the vehicle 1 with power supplied from a battery, and is connected to the battery (not shown) mounted in a rear portion of the vehicle body 2 by a cable 10. As described above, the PCU 9 is arranged on the powertrain, and the resonator 8 is arranged on the powertrain.

Referring to FIG. 2, the resonator 8 is a hollow body having a space extending from an air inlet 11 to a resonance chamber 13 through a passage 12. The resonance chamber 13, which is a main part of the resonator 8, is a flat box-shaped chamber having a hollow internal space divided into plural sections, and reduces the intake noise by resonance. The resonator 8 is made of a material having relatively low rigidity.

Figure 6:
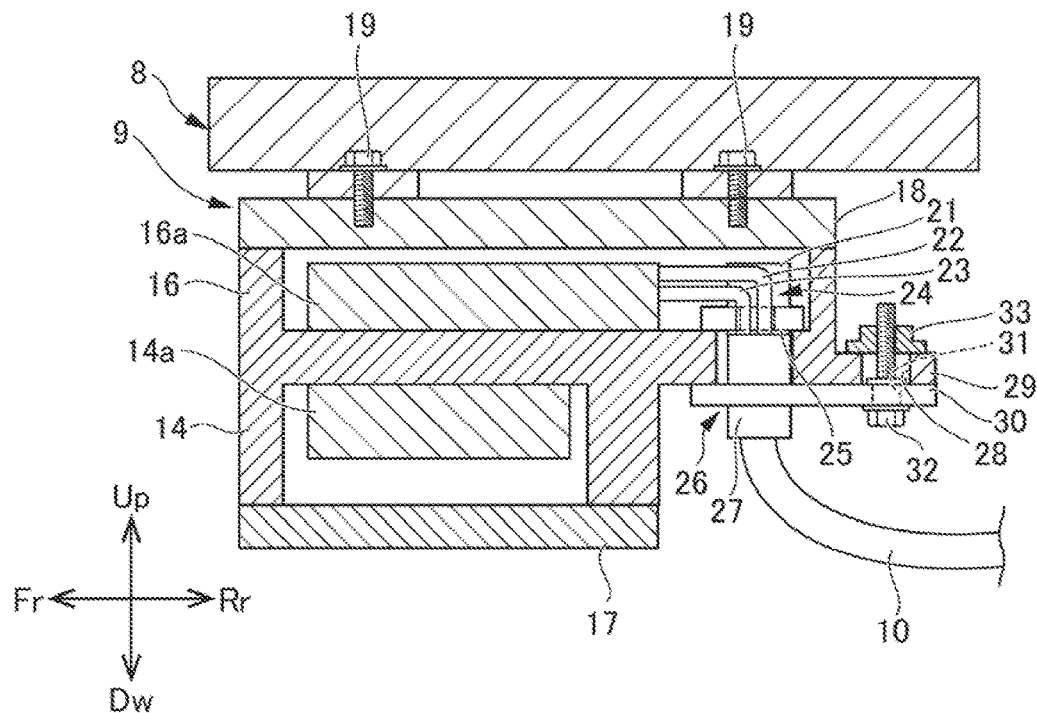
FIG. 6 is a schematic view illustrating an initial state in a procedure of opening the terminal port by disconnecting a cable from the cable mount provided for the electric device mounted on the vehicle of FIG. 1.

Referring to FIG. 3, the PCU 9 has a box-like outer shape made of a converter case 16 stacked on and bolted to an inverter case 14 with a divider 15 sandwiched therebetween. A lower cover 17 seals the bottom of the inverter case 14. An upper cover 18 seals the top of the converter case 16. As is clearly shown in FIG. 2, the resonator 8 is fastened to the top of the converter case 16 with bolts 19. As shown in FIG. 6 and the following drawings, the inverter case 14 houses circuits such as an inverter 14a, and the converter case 16 houses circuits such as a DC-DC converter 16a. In the following description, the circuits such as the inverter 14a will be collectively referred to as the inverter 14a, and the circuits such as the DC-DC converter 16a will be collectively referred to as the DC-DC converter 16a.

Referring to FIG. 3, a cable mount 20 is provided at a rear end of the converter case 16 of the PCU 9. As is clearly shown also in FIG. 5, the cable mount 20 is formed as a male connector 24 including a case-side connector housing 21 continuous with the converter case 16, and a male positive electrode terminal 22 and a male negative electrode terminal 23 in the case-side connector housing 21. A terminal port 25 of the male connector 24 faces roughly downward in the vertical direction when mounted on the vehicle.

A female connector 26, which is a counterpart of the male connector 24, is provided at an end of the cable 10 which is a so-called DC cable. The female connector 26 includes a female positive electrode terminal and a female negative electrode terminal, which are not shown, in a cable-side connector housing 27. The male connector 24 and the female connector 26 are so-called DC connectors.

A support 29 having a bolt hole 28 for fastening the female connector 26 overhangs laterally outward from the case-side connector housing 21 which is a housing of the male connector 24. A support target plate 30 corresponding to the support 29 of the male connector 24 overhangs laterally outward from the cable-side connector housing 27 which is a housing of the female connector 26. The support target plate 30 has a bolt hole 31 corresponding to the bolt hole 28 of the support 29.

The female connector 26 is fitted on the male connector 24, and a headed bolt 32 is inserted into the bolt hole 31 of the support target plate 30 and the bolt hole 28 of the support 29 from bottom to top. In this state, a flange nut 33 is screwed onto the headed bolt 32 from the support 29 to fasten the female connector 26 and the male connector 24 together.

Referring to FIGS. 6 to 11, a procedure of opening the terminal port 25 by disconnecting the cable 10 from the male connector 24 which is the cable mount will be described below. Referring to FIGS. 6 to 11, the outer shell of the PCU 9 is formed of the converter case 16 placed on and fastened to the inverter case 14 with the divider 15 sandwiched therebetween. The inverter case 14 houses the inverter 14a, and the converter case 16 houses the DC-DC converter 16a. The male positive electrode terminal 22 and the male negative electrode terminal 23 exposed in the terminal port 25 of the male connector 24 are connected to the DC-DC converter 16a.

FIG. 6 shows an initial state in the procedure of opening the terminal port 25 of the male connector 24. The female connector 26 is fitted on the male connector 24 to connect the cable 10 and the PCU 9. The male connector 24 and the female connector 26 are fastened together with the headed bolt 32 and the flange nut 33. The resonator 8 is fastened to the PCU 9 with the bolts 19 and arranged at a position where the resonator 8 normally functions when mounted on the vehicle.

In the state of FIG. 6, the male connector 24 and the female connector 26 are located within an area of a plane of projection of a portion of the resonator 8 extending toward the rear side of the vehicle 1. Thus, the resonator 8 keeps the male connector 24 and the female connector 26 out of reach of a human seeing the open engine room 5 from above as shown in FIG. 1. The resonator 8 is fastened to the converter case 16 of the PCU 9 with the bolts 19. The resonator 8 cannot be detached from the PCU 9 unless a suitable tool is used. This makes access to the male connector 24 and the female connector 26 difficult without suitable preparation. Specifically, in a normal state, there is no risk of a human carelessly touching the male positive electrode terminal 22 and the male negative electrode terminal 23 in the terminal port 25 of the male connector 24 and receiving an electric shock.

Figure 7:
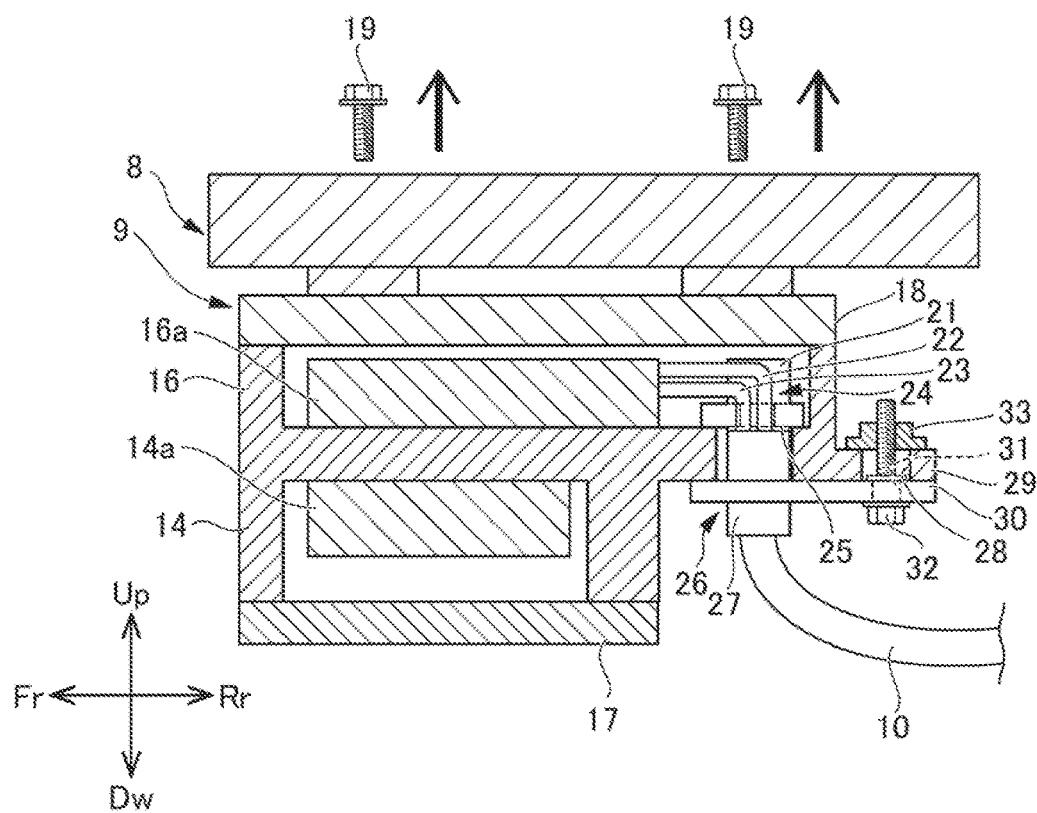
FIG. 7 is a schematic view illustrating a state in the procedure following the state of FIG. 6.
Figure 8:
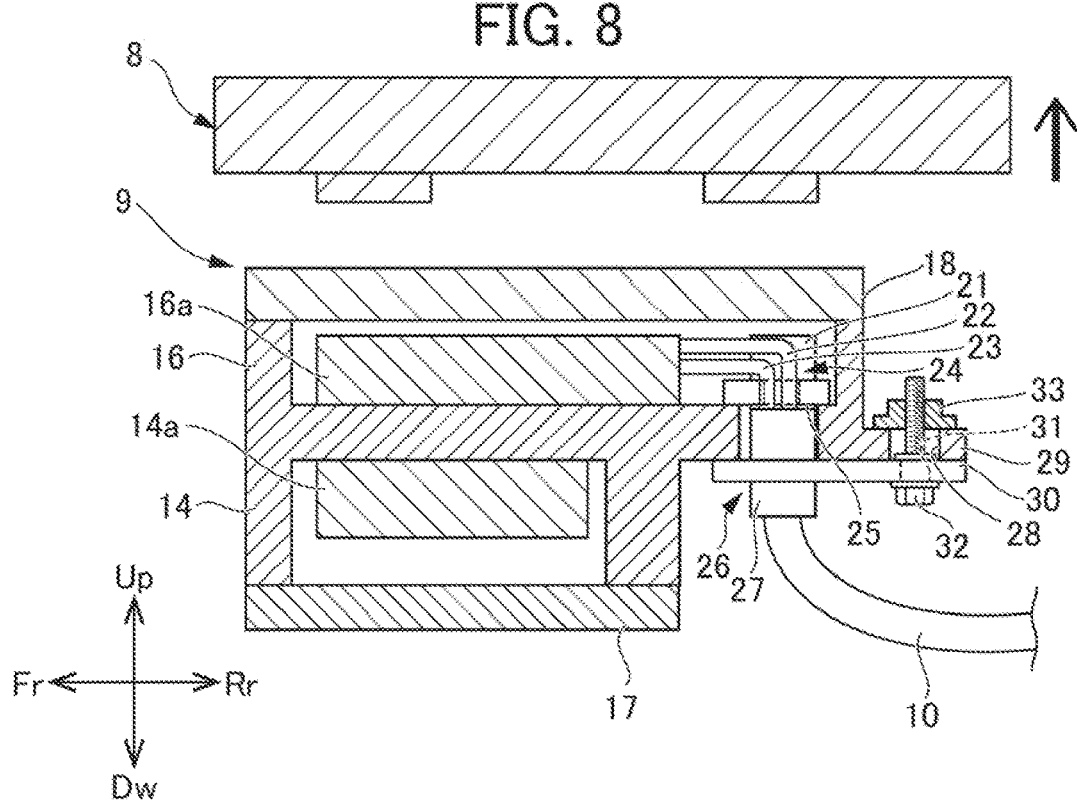
FIG. 8 is a schematic view illustrating a state in the procedure following the state of FIG. 7.

FIG. 7 shows the state in which the bolts 19 for fastening the resonator 8 to the PCU 9 are detached with a suitable tool. When the bolts 19 are detached, the resonator 8 can be removed upward as shown in FIG. 8. When the resonator 8 is detached, the upper cover 18 on the top of the PCU 9 is visible as shown in the plan view of FIG. 4.

Figure 9:
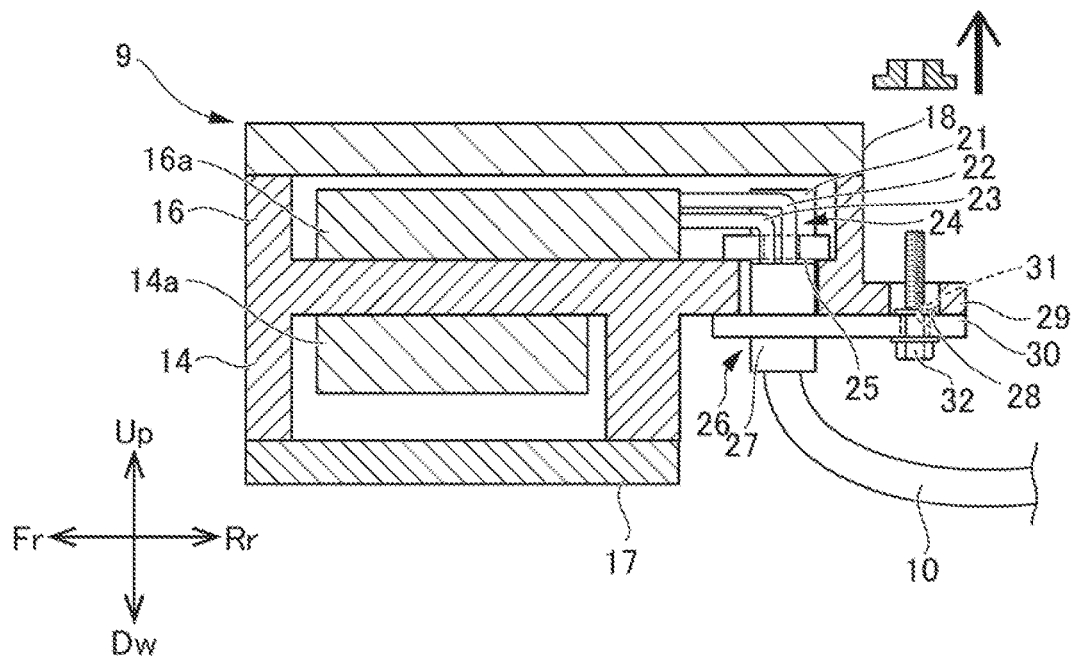
FIG. 9 is a schematic view illustrating a state in the procedure following the state of FIG. 8.
Figure 10:
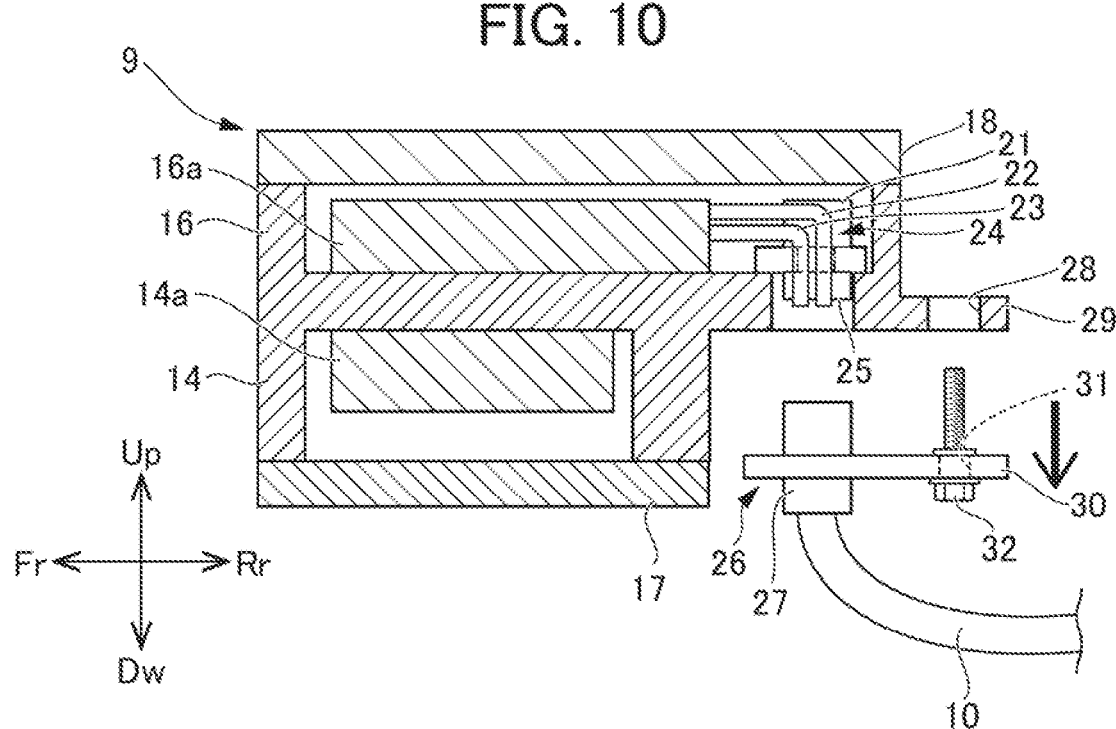
FIG. 10 is a schematic view illustrating a state in the procedure following the state of FIG. 9.

When the resonator 8 is detached, the flange nut 33 on the headed bolt 32 fastening the support 29 overhanging laterally outward from the case-side connector housing 21 and the support target plate 30 of the female connector 26 can be handled from above as shown in FIG. 9. When the flange nut 33 is removed upward, the male connector 24 and the female connector 26 that have been fitted and fastened together with the headed bolt 32 and the flange nut 33 can be separated as shown in FIG. 10.

Figure 11:
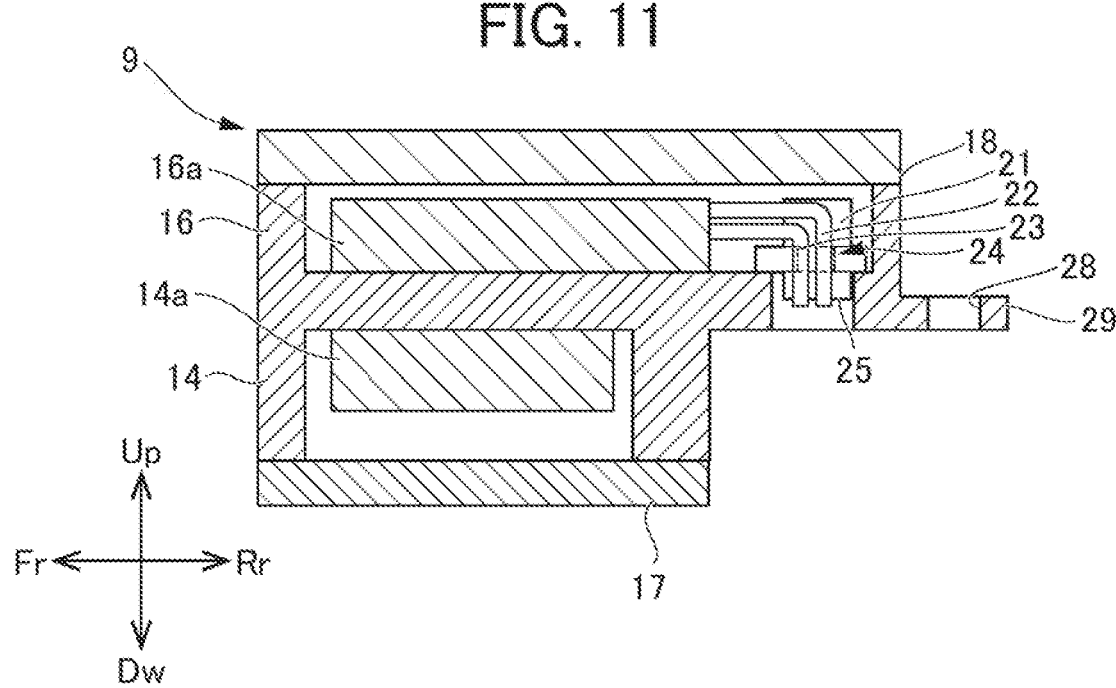
FIG. 11 is a schematic view illustrating a state in the procedure following the state of FIG. 10.

When the female connector 26 of the cable 10 is separated from the male connector 24 as shown in FIG. 11, a human can have access to the terminal port 25 of the male connector 24 by hand. The terminal port 25, which faces downward, can effectively reduce the risk of the human carelessly touching the exposed male positive electrode terminal 22 and male negative electrode terminal 23 and receiving an electric shock.

The vehicle 1 of the present embodiment has the following advantages.

(1) The vehicle 1 includes: the PCU 9 mounted on the vehicle 1; the resonator 8 placed on the PCU 9 to extend further rearward than the PCU 9 in plan view when mounted on the vehicle; the cable 10 connecting the PCU 9 and the battery mounted on the vehicle 1; and the male connector 24 that is provided below and within a plane of projection of the resonator 8 on the PCU 9 and has the terminal port 25 facing downward in the vertical direction when mounted on the vehicle. This reduces the risk of a human touching the male positive electrode terminal 22 and male negative electrode terminal 23 of the male connector 24, improving safety.

In the vehicle 1 of (2), the cable 10 (the female connector 26 of the cable 10) is fastened to the PCU 9 with the headed bolt 32. This makes it difficult to detach the cable 10 (the female connector 26 of the cable 10), and reduces the risk of a human touching the male positive electrode terminal 22 and male negative electrode terminal 23 of the male connector 24, improving safety.

In the vehicle 1 of (3), the resonator 8 is fastened to the PCU 9 with the bolts 19. Thus, the resonator 8 cannot be easily detached, blocking easy access of a human's hand to the male connector 24 below the resonator 8. This reduces the risk of a human touching the male positive electrode terminal 22 and male negative electrode terminal 23 of the male connector 24, improving safety.

In the vehicle 1 of (4), the PCU 9 is mounted in a front portion of the vehicle 1 and has the male connector 24 provided at a rear portion of the PCU 9. This can improve safety in a collision.

In the vehicle 1 of (5), the resonator 8 has lower rigidity than the PCU 9. This can reduce the influence on the PCU 9 in a collision.

In the vehicle 1 of (6), the PCU 9 is arranged on the powertrain of the vehicle 1, and the resonator 8 is arranged on the PCU 9. This can reduce the influence on the PCU 9 in a collision.

Embodiments of the present invention have just been described above, but the present invention is not limited to those exemplary embodiments. Details of the configuration may be altered appropriately within the spirit of the present invention. For example, it has been described above that the cable mount having the terminal port facing downward is arranged below and within a plane of projection of the resonator, especially a body of the resonator. However, a dummy member may be provided to extend rearward from the rear end of the resonator so that the cable mount is arranged below and within a plane of projection of the dummy member.

EXPLANATION OF REFERENCE NUMERALS

1 Vehicle
2 Vehicle body
3 Front portion
4 Dash panel
5 Engine room
6 Side member
7 Lateral member
8 Resonator
9 PCU
10 Cable
11 Air inlet
12 Passage
13 Resonance chamber
14 Inverter case
14a Inverter
15 Divider
16 Converter case
16a DC-DC converter
17 Lower cover
18 Upper cover
19 Bolt
20 Cable mount
21 Case-side connector housing 22 Male positive electrode terminal
23 Male negative electrode terminal
24 Male connector
25 Terminal port
26 Female connector
27 Cable-side connector housing
28 Bolt hole
29 Support
30 Support target plate
31 Bolt hole
32 Headed bolt
33 Flange nut

What is claimed is:

1. A vehicle, comprising: an electric device mounted on the vehicle;
    a functional component placed on the electric device to extend further rearward than the electric device in plan view when mounted on the vehicle;
    a cable connecting the electric device and a battery mounted on the vehicle; and
    a cable mount positioned below within the plane projection of the functional component of the electric device and has a terminal port facing downward in a vertical direction when mounted on the vehicle,
    wherein the cable mount is formed as a male connector including a case-side connector housing continuous with the converter case of the electric device, and a male positive electrode terminal and a male negative electrode terminal in the case-side connector housing, wherein a cable-side connector housing of a female connector provided at an end of the cable is fastened to the male connector.

2. The vehicle of claim 1, wherein the cable is fastened to the electric device with a bolt.

3. The vehicle of claim 1, wherein the functional component is fastened to the electric device with a bolt.

4. The vehicle of claim 1, wherein the electric device is mounted in a front portion of the vehicle and has the cable mount provided at a rear portion of the electric device.

5. The vehicle of claim 1, wherein the functional component has lower rigidity than the electric device.

6. The vehicle of claim 1, wherein the electric device is arranged on a powertrain of the vehicle, and the functional component is arranged on the electric device.

7. The vehicle of claim 1, wherein the male connector is provided so that a support having a bolt hole for fastening the cable-side connector housing of the female connector overhangs.

8. The vehicle of claim 1, wherein the cable mount is provided at a rear portion of the electric device,
    the support is provided so as to overhang further rearward than the cable mount,
    the functional component placed on the electric device and extends further rearward than the cable mount, in side view.

* * * * *